Aug. 12, 1947.  W. ALEXANDER  2,425,588
VORTEX DUST SEPARATOR
Filed June 22, 1945
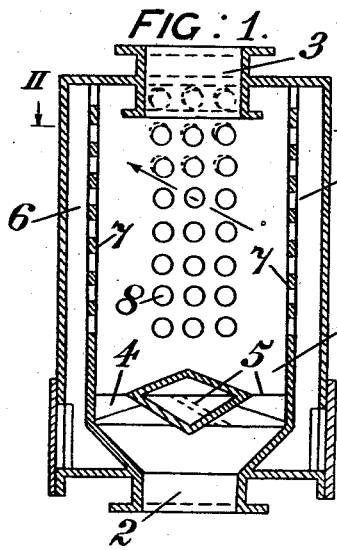
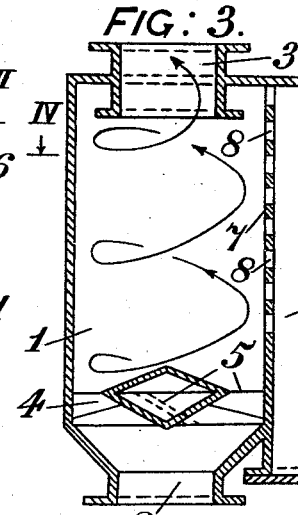
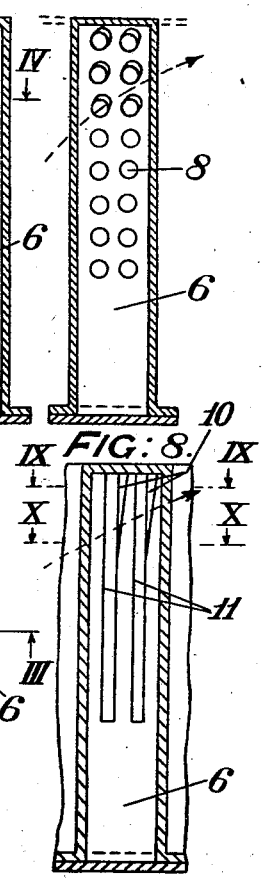
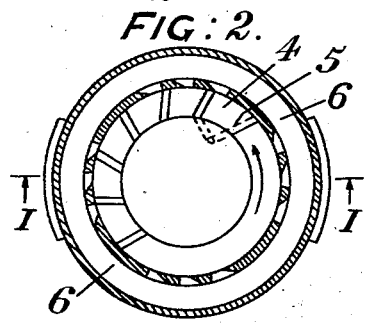
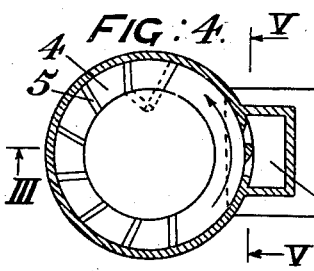
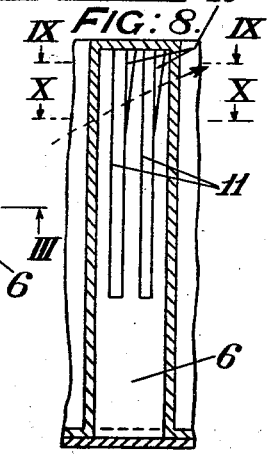
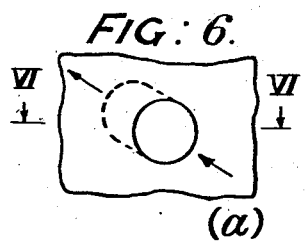
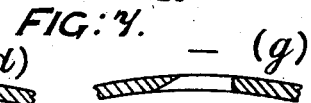
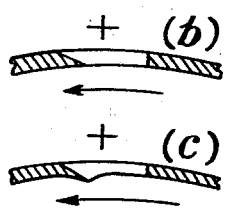
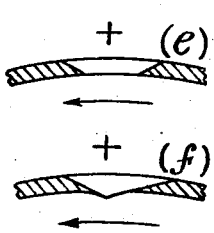
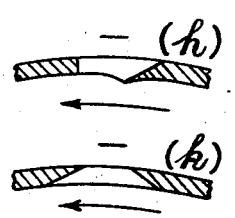
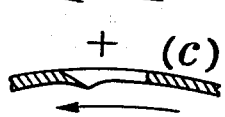
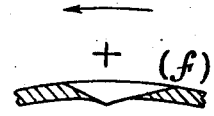
INVENTOR
William Alexander
By [signature]
his ATTY.

Patented Aug. 12, 1947

2,425,588

UNITED STATES PATENT OFFICE 2,425,588

VORTEX DUST SEPARATOR

William Alexander, Glasgow, Scotland

Application June 22, 1945, Serial No. 600,903
In Great Britain March 28, 1945

7 Claims. (Cl. 183—94)

This invention relates to separators of the vortex type for separating or extracting comparatively dense solid or liquid particles (hereinafter and in the claims referred to as dust) from gaseous or vaporous fluids (hereafter referred to as gas) in which dust is entrained, the said separators being of the kind that has perforations or apertures in the side wall or a partition of a vortex chamber through which the dust laden gas whirls, and through which apertures the dust is ejected by centrifugal action into a dust receiver wherein the dust may settle downwards under the action of gravity and deposit on the bottom, or be continuously removed therefrom by any suitable device. The said receiver may extend round the whole of the circumference of the vortex chamber or over only a part thereof. In both of these cases the said perforated side wall or partition constitutes a partition between the vortex chamber and the dust receiver.

In separators of the kind aforesaid the gas whirls through the vortex chamber in a substantially helical path and the gas outlet of the vortex chamber is usually approximately centrally situated therein and at the opposite end of that chamber from the gas inlet, the vortex having considerable axial length. Now, in virtue of the always present frictional resistance to gas flow in any vessel or passage of appreciable length, the gas pressure at or near the inlet end of the vortex chamber is always more than that at or near the outlet end. This pressure difference increases as the square of the velocity of gas flow, and is communicated through the openings, orifices or apertures to the gas in the dust receiver. Thus, unless means are taken to prevent it, there is a flow of gas from the inlet end of the vortex chamber through the adjacent apertures into the dust receiver; this flow continues therein with a component parallel to the axis of the vortex chamber, and proceeds to those apertures adjacent to the gas outlet end of the vortex chamber and then passes out of the receiver through them to rejoin the vortex. This gas returning from the dust receiver takes back with it some entrained dust to the vortex chamber, and any such gas flow in the receiver, with consequent loss of dust, reduces the efficiency of dust extraction. These adverse actions, as explained, are due to the said pressure difference generated in the dust receptacle by the frictionally resisted flow through the vortex chamber. This pressure difference may thus be said to be a frictional one.

One of the chief objects of the present invention is to overcome or mitigate the said loss in efficiency of dust extraction.

Reference will now be made to the accompanying drawings, which show, by way of example, improved separators in accordance with the invention, and various formations of apertures with appropriate edges.

Fig. 1 is a sectional elevation on the line I—I of Fig. 2, of an up-flow separator in which the dust receiver surrounds the vortex chamber.

Fig. 2 is a sectional plan on the line II—II, Fig. 1.

Figs. 3 and 4 are similar views on the lines III—III, and IV—IV, respectively, of an up-flow separator in which the dust receiver extends over only a part of the circumference of the side wall of the vortex chamber.

Fig. 5 is a sectional elevation on the line V—V, Fig. 4.

Fig. 6 shows fragmentary enlarged views of the formation around a circular orifice or aperture in elevation at $a$, and with alternative corresponding sectional plans $b$ and $c$ taken on the line VI—VI, such orifices or apertures being similar to those in the upper three rows shown in the first five figures, and their edges being unsymmetrically shaped.

Fig. 7 shows sectional plan views of various alternative formations around apertures; in $d$ the edge of the aperture is not modified, the aperture being of ordinary type with its edges substantially perpendicular to the sides of the partition.

Fig. 8 is a fragmentary sectional elevation corresponding to Fig. 5, of a modified form of aperture, and Figs. 9 and 10 are enlarged sectional plans on the lines IX—IX and X—X thereof, respectively.

The separators in Figs. 1 to 4 have a vortex chamber 1, gas inlet 2 and gas outlet 3. The ingoing gas reaches passages 4 formed between fixed inclined guide vanes 5, and enters the vortex chamber 1 with an upward, helical, whirl and with a direction of motion over the concave surface of the vortex chamber roughly as indicated by the arrows in all of the figures. The dust receiver 6 in Figs. 1 to 4 has one of its sides formed by the outer surface of the vortex chamber's side wall 7, which wall thus constitutes a partition. Rows of orifices, openings or apertures 8 are provided in this partition, and these rows are arranged in succession in the direction from inlet towards outlet, and they allow fluid communication between the vortex chamber and the dust receiver. For the sake of brevity, the apertures closer to the inlet end of the vortex chamber will be called the inlet-end apertures; also, the apertures nearer to the gas outlet end of the vortex chamber will be called the outlet-end apertures. The walls of the three uppermost rows of outlet end orifices or apertures at the down-stream or trailing portions are inclined or bevelled as typically shown in Fig. 6, *a* and *b* or *c*, while the walls of the inlet end apertures have their edges of the usual, unmodified, shape, that is, as shown in Fig. 7 *d*. The inclined formation is formed on that half of the trailing edge of the walls of the openings, orifices or apertures transverse to the general direction of helical gas flow. Instead of three rows of outlet end aperture walls with bevelled edges such as at *b* or *c*, there may be one, or other desired number, of outlet end rows or aperture walls with such edges, whilst there are one or more inlet end rows or aperture walls with usual edges as at Fig. 7 *d*.

The "plus" sign on the convex side of the partition in Fig. 6 at *b* and *c* serves to indicate that an aerodynamic positive pressure is generated on that side of the aperture as compared with the pressure on the concave side when the gas flows over the latter in the direction of the arrow; this is due to the aerodynamic reaction of the inclined surface formation of the aperture wall on the impinging gas flow and deflecting part thereof towards the receiver to build up an aerodynamic pressure therein. The corresponding apertures are called plus apertures. Analogously, an ordinary aperture as at *d*, Fig. 7, is called a zero aperture, because there is little or no change in pressure between the concave and convex sides of the partition due to the gas flow. The apertures *e* and *f*, Fig. 7, being also plus, are marked with a plus sign; while apertures *g*, *h* and *k* are all minus and are marked with that sign, because the vortical gas flow in the direction of the arrow aerodynamically reacting with the edge formation of the apertures causes the pressure to be less on the convex side than on the concave side of the partition.

The inclined formations at Fig. 6 (*c*), and Figs. 7 (*f*) and 7 (*h*) protrude from the surface of the partition into the gas flow in the vortex chamber.

The combination of the inlet end and outlet end apertures described for the separators of the first five figures is, the far ones plus, the near ones zero. This combination gives rise to an aerodynamic plus pressure gradient from the outlet or upper end to the inlet or lower end of the dust receiver that partially or completely balances, or even reverses, the abovementioned frictional pressure difference due to the frictional resistance to vortical flow in the vortex chamber and as between the inlet and the outlet ends both of that chamber and the dust receiver. In other words, the said aerodynamic plus pressure gradient from the outlet to the inlet end opposes the explained frictional pressure difference from the inlet to the outlet end in the receiver. Thus the speed of the gas flow in the dust receiver is reduced when there is a given flow in the vortex, so that less entrained dust is returned thereto and the separation or extraction efficiency of the separator is consequently higher than if all of the apertures had similar edges or all gave equal aerodynamic pressure change between the two sides of the partition.

Combinations of other differing apertures, that is, having differently shaped edge or wall formations, alternative to those described above can also be used to give aerodynamic plus pressure gradient in the dust receiver to oppose the mentioned frictional pressure difference therein. Examples of alternative combinations of various differing apertures are:

1. One or more plus apertures such as *a*, *b*, *c*, *e* and *f*, or any other plus kind, located toward the outlet end, combined with one or more minus apertures such as *g*, *h* or *k* or zero apertures located more toward the inlet end;

2. One or more minus apertures toward the inlet end combined with one or more zero ones more toward the outlet end;

3. One or more plus apertures toward the outlet end combined one or more zero apertures intermediately placed, and one or more minus ones more toward the inlet end;

4. In general, one or more apertures toward the outlet end that are more aerodynamically plus than those more toward the inlet end.

In some separators there may be only one column of apertures i. e. one aperture or opening in each row, or there may be two or more rows and two or more columns. Instead of circular shape they may be triangular, square, or of elongated curved or rectangular or any desired shape.

Again, instead of the aforesaid apertures there may be one or more elongated apertures, openings or slots extending along the partition approximately from the inlet end to the outlet end. This is illustrated by way of example in Figs. 8, 9, and 10; in this case the inclined edges 10 of the slots 11 have a maximum inclination at the outlet end and this inclination is gradually reduced to zero about one-third of the way to the inlet end, as will be evident from Figs. 9 and 10.

The invention has been described with reference to the up-flow separators exemplified in the first five figures. The axes of the vortex chambers are shown substantially vertical, and the gas is admitted through inclined admission passages formed by fixed vanes in an annular space substantially concentric with the vortex chamber. But the axis can be inclined instead if desired, and the gas may be alternatively admitted to the vortex chamber through one or more ducts, of pipe form, disposed, say, tangentially round the inlet end of the separator instead of being admitted through a vaned annular passage. Further, the separator may be of down-flow instead of up-flow type.

I claim:

1. A vortex dust separator for separating dust from whirling dust-laden gas passing therethrough comprising a vortex chamber through which said dust-laden gas whirls during its passage, a dust receiver, and a partition between said vortex chamber and said receiver, said partition being provided with orifices through which dust passing through said chamber may pass to said receiver, said orifices being disposed in said partition so as to extend in the direction from the inlet end towards the outlet end of said vortex chamber, the wall of at least one of said orifices in said partition nearer the outlet end extending at an angle which is inclined from the chamber to the receiver in the direction of the gas flow, and which reacts with the flow of dust-laden gas to cause an aerodynamic increase of gas pressure in the receiver at the outlet end thereof relative to the inlet end.

2. A vortex dust separator for separating dust from whirling dust-laden gas passing therethrough, comprising in combination a vortex chamber through which the dust-laden gas whirls during its passage, a dust receiver and a partition between said vortex chamber and said receiver, said partition having orifices therein through which the dust may pass to the receiver, said orifices being disposed in said partition in succession from the inlet towards the outlet end of the vortex chamber, the wall at the trailing edge of at least one of the orifices nearer the outlet end having a formation inclined from the vortex chamber towards the receiver in the direction of flow, said formation reacting with the flow of dust-laden gas to cause an aerodynamic increase of gas pressure in the receiver at that end of the receiver towards the outlet end thereof.

3. A separator as claimed in claim 2, in which the partition has a protrusion at the leading edge of said orifice, said protrusion extending into the path of the gas flow in the vortex chamber.

4. A vortex dust separator for separating dust from whirling dust-laden gas passing therethrough, comprising in combination a vortex chamber through which the dust-laden gas whirls during its passage, a dust receiver and a partition between said vortex chamber and said receiver, said partition having orifices therein through which the dust may pass to the receiver, said orifices being successively disposed in said partition from the inlet to the outlet end of said vortex chamber, the wall of at least one of said orifices in said partition adjacent the inlet end being inclined from the receiver towards the vortex chamber in the direction of the gas flow, said inclined wall reacting with the flow of dust-laden gas to cause an aerodynamic reduction in the gas pressure at the inlet end of the chamber.

5. A vortex dust separator for separating dust from whirling dust-laden gas passing therethrough comprising in combination a vortex chamber through which said dust-laden gas whirls during its passage, a dust receiver and a partition between said vortex chamber and said receiver, said partition being provided with orifices through which dust passing through said chamber may pass to said receiver, said orifices being disposed over the area of said partition from the inlet towards the outlet end of the vortex chamber, the wall of at least one of said orifices nearer the outlet end of the chamber being inclined at an angle from the chamber to the receiver in the direction of the gas flow to react with the flow of dust-laden gas to cause an aerodynamic increase of gas pressure in the receiver at said outlet end, the wall of at least one of the orifices nearer the inlet end of the chamber being inclined at an angle from the receiver to the chamber in the direction of the gas flow and reacting with the flow of dust laden gas to cause an aerodynamic reduction in gas pressure in the receiver at the inlet end.

6. A vortex dust separator for separating dust from whirling dust-laden gas passing therethrough comprising in combination a vortex chamber through which said dust-laden gas whirls during its passage, a dust receiver and a partition between said vortex chamber and said receiver, said partition having an orifice therein extending over a substantial portion of the length thereof and through which dust passing through said chamber may pass to said receiver, a portion of the wall of said orifice adjacent the outlet end of the receiver being contoured to provide a surface extending generally at an angle from the chamber to the receiver in the direction of the gas flow at the chamber side of said partition, said surface reacting aerodynamically with said gas flow to cause an increase of gas pressure in the receiver at the outlet end thereof over the pressure existing at the inlet end thereof.

7. A vortex dust separator for separating dust from whirling dust-laden gas passing therethrough comprising in combination a vortex chamber through which said dust-laden gas whirls during its passage, said chamber having an inlet and an outlet passage, a dust receiver and a partition between said vortex chamber and said receiver, means in said partition adjacent each end thereof providing for the passage of dust particles therethrough from the chamber to the receiver, said means at the outlet end of said chamber having surfaces inclined at an angle from the chamber to the receiver in the direction of the gas flow, and at the inlet end having surfaces arranged at an angle other than the angle at the outlet end so as to cause an aerodynamic increase of gas pressure in the gas in the receiver at the outlet end thereof.

WILLIAM ALEXANDER.

REFERENCES CITED

The following references are of record in the file of this patent:

UNITED STATES PATENTS

| Number | Name | Date |
|---|---|---|
| 387,617 | Ash | Aug. 14, 1888 |
| 526,334 | Volm | Sept. 18, 1894 |
| 1,226,307 | Buxton et al. | May 15, 1917 |
| 1,721,908 | Heist | July 23, 1929 |
| 1,898,608 | Alexander | Feb. 21, 1933 |
| 2,201,301 | Richardson | May 21, 1940 |